United States Patent Office 3,196,150
Patented July 20, 1965

3,196,150
2 CHLORO-9-[13-(4 CARBAMOYL-1-PIPERAZINYL) PROPYLIDENE]THIOXANTHENE DERIVATIVES
Johann Martin Grisar, New London, Conn., assignor to Chas. Pfizer & Co., Inc., New York, N.Y., a corporation of Delaware
No Drawing. Filed Jan. 15, 1963, Ser. No. 251,499
14 Claims. (Cl. 260—240)

This invention relates to new and useful chemical compounds. More particularly, it relates to substituted chlorothioxanthenes, and the acid addition salt derivatives thereof. These compounds are valuable as psychotherapeutic agents and as intermediates in the production of such agents.

The new compounds contemplated by the present invention are demonstrated by the formula:

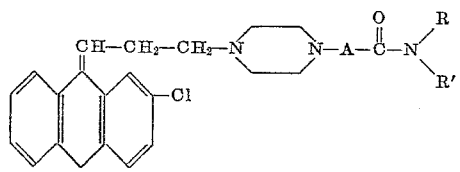

and include the acid addition salts thereof, wherein R is hydrogen, lower alkyl, aryl, such as phenyl, tolyl, phenylene and the like, arylalkyl, such as benzyl, phenethyl, phenpropyl, phenbutyl and the like, wherein the alkyl radical contains from 1 to about 5 carbon atoms, said alkyl radical being a straight or branched chain, lower alkenyl or hydroxyalkyl; R' is hydrogen or lower alkyl or R and R' when taken together with the nitrogen atom to which they are joined form a cyclic member selected from the group consisting of pyrrolidino, piperidino, piperazino and morpholino; and wherein A represents a lower alkylene radical, for example, a straight or branched chain alkylene radical having from about 1 to about 3 carbon atoms.

The compounds of the instant invention are valuable for the chemotherapy of mental diseases and especially for the control of excited states. Also, these compounds have potent antiemetic properties.

Particularly valuable for this purpose are compounds of the following formula:

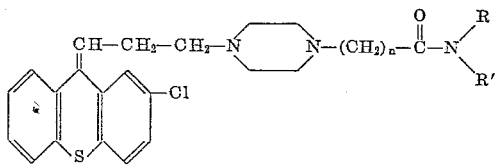

wherein R and R' each is a member selected from the group consisting of hydrogen and lower alkyl; and n is an integer of 1 to 2.

The compounds of the present invention may be prepared by a number of procedures. One especially convenient procedure is outlined in the following reaction scheme:

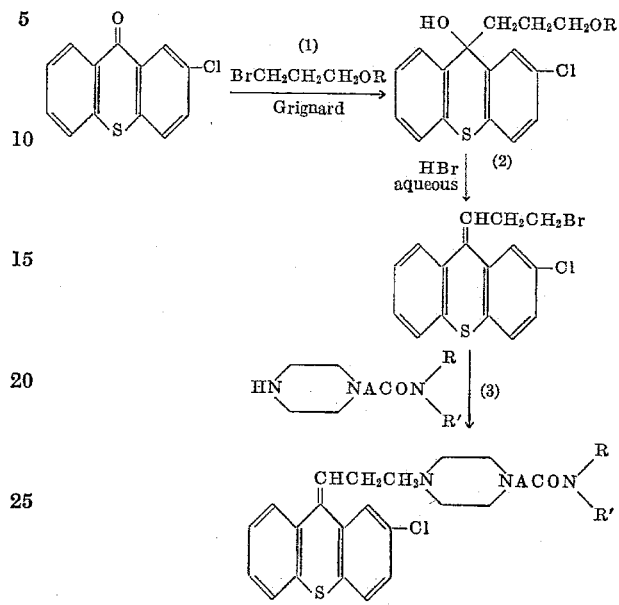

In step (1) of this scheme, 2-chlorothioxanthenone is readily reacted with an alkoxy propyl bromide, for example, by means of the Grignard reaction to yield the 2 - chloro - 9 - hydroxy-9-(3-alkoxypropyl)thioxanthene. This compound is then treated with aqueous concentrated hydrobromic acid while gaseous hydrogen bromide is bubbled through the reaction mixture, as shown in step (2), to yield 2-chloro-9-(3-bromopropylidene)thioxanthene. In step (3), 2-chloro-9-(3-bromopropylidene)-thioxanthene is reacted with an appropriately substituted piperazine, such as, for example, a 4-carbamoylalkyl-piperazine to yield the 2-chloro-9-[3-(4-carbamoylalkyl-1-piperazinyl)propylidene]thioxanthene.

More specifically, the reactions in the scheme described hereinbefore may be carried out as follows: for example, a solution of 0.4 mole of 3-t-amyloxypropyl magnesium bromide in about 1 liter of anhydrous ethyl ether and 0.2 mole of 2-chlorothioxanthenone are refluxed for about 24 hours. An ammonium chloride solution (120 g. ammonium chloride in 600 ml. of water) is added to the reaction mixture and the ether phase is separated, washed and dried. Evaporation of the ether yields 2-chloro-9-hydroxy-9(3-t - amyloxypropyl) - thioxanthene which is recrystallized from isopropyl ether. This compound is added to concentrated hydrobromic acid and the mixture is refluxed while hydrogen bromide gas is bubbled through the solution. After about 1 hour, about 4 liters of water are added to the reaction mixture and the crude product is extracted with ether. The ether extract is washed with water and sodium bicarbonate solution and dried. Evaporation of the ether yields 2-chloro-9-(3-bromopropylidene)thioxanthene which may be crystallized from an ether-petroleum ether mixture.

About 0.01 mole of the bromopropylidene compound and about 0.03 mole of a 4-carbamoylalkylpiperazine, such as 4-carbamoylmethylpiperazine, are refluxed in methylethyl ketone for about 12 hours. The solvent is evaporated under reduced pressure and the product is taken up in ether and washed with water. The product is thereafter extracted with 1 N hydrochloric acid, the extract washed with ether, made alkaline with 10% sodium carbonate solution and the product extracted with ether. The extract is washed with water and dried. The ether is evaporated and the product treated with two equivalents of maleic acid to form the dimaleate salt of 2-chlor-9-[3-(4-carbamolymethyl-1-piperazinyl)-propylidene]thioxanthene.

With respect to step (1) as described hereinbefore, the Grignard reaction may be carried out with alkenyl bromide or an alkoxypropyl bromide such as t-amyloxypropyl bromide and benzyloxypropyl bromide, preferably using about 100% excess of Grignard reagent. The preparation of t-amyloxypropyl bromide may be readily effected by the reaction of 3-bromopropyl alcohol and trimethylethylene.

Step (2) of the scheme described hereinbefore may be readily carried out by refluxing the Grignard product in aqueous concentrated hydrobromic acid while bubbling gaseous hydrogen bromide through the reaction mixture. Refluxing for a period of about one hour is satisfactory when the Grignard product is made with t-amyloxypropyl bromide. When the Grignard product is made with benzyloxypropyl bromide, dehydration and ether cleavage may be readily effected by refluxing about sixteen hours.

With respect to step (3) in the reaction scheme, two alternatives are available. Introduction of the substituted piperazine moiety may be achieved by first preparing the monosubstituted piperazine and reacting it with the bromopropylidene compound to yield the desired product of this invention, or alternatively, the bromopropylidene compound may be reacted with piperazine, followed by reaction with halogen substituted mono- or dialkylamide or with a N-mono-, di-, or unsubstituted acrylamide.

The reaction scheme is illustrated as follows:

wherein X is a halogen, preferably chlorine or bromine, and A, R and R' are the same as defined hereinbefore.

Step (a) of the reaction scheme may be carried out by using about 50% excess of the mono substituted piperazine and potassium carbonate in amyl alcohol. A preferred method is to reflux with methylethyl ketone or dimethylformamide and using greater than 100% excess of the mono substituted piperazine instead of potassium carbonate.

In the alternative procedure of the reaction, steps (b) and (c), the bromopropylidene compound, step (b) is refluxed with an excess of carbethoxypiperazine in methylethyl ketone for about 12 hours followed by acid extraction of the product. This product is thereafter treated with 4 N potassium hydroxide in 80% ethanol to yield the piperazinyl propylidene compound. The conversion of the piperazinyl propylidene compound to the final product of this invention is effected in step (c) by reaction with a chloro- or bromo-substituted mono- or dialkylamide in the presence of anhydrous potassium carbonate, or with a N-mono-, di-, or unsubstituted acrylamide. A suitable solvent is dimethylformamide. The reaction is carried out at temperatures of from about 25° to about 85° C. for a period of from about 12 to 180 hours.

The 2-chloro-9-[3-(4-carbamoylalkyl-1-piperazinyl)-propylidene]thioxanthene obtained by any of the above methods can be converted to an acid addition salt by the usual methods. For example, the base can be dissolved in absolute alcohol or other suitable solvent such as diethyl ether or acetone and the selected acid added thereto. Mineral acid addition salts and organic acid addition salts such as salts derived from hydrochloric, hydrobromic, nitric, sulfuric, phosphoric, acetic, citric, tartaric, lactic, maleic and the like, can be prepared by this or other suitable methods.

It is obvious that acids which can be used to prepare the acid addition salts are preferably those which produce, when combined with the free base, salts whose anions are relatively innocuous to the animal organism in therapeutic doses of the salts, so that beneficial physiological properties inherent in the free base are not vitiated

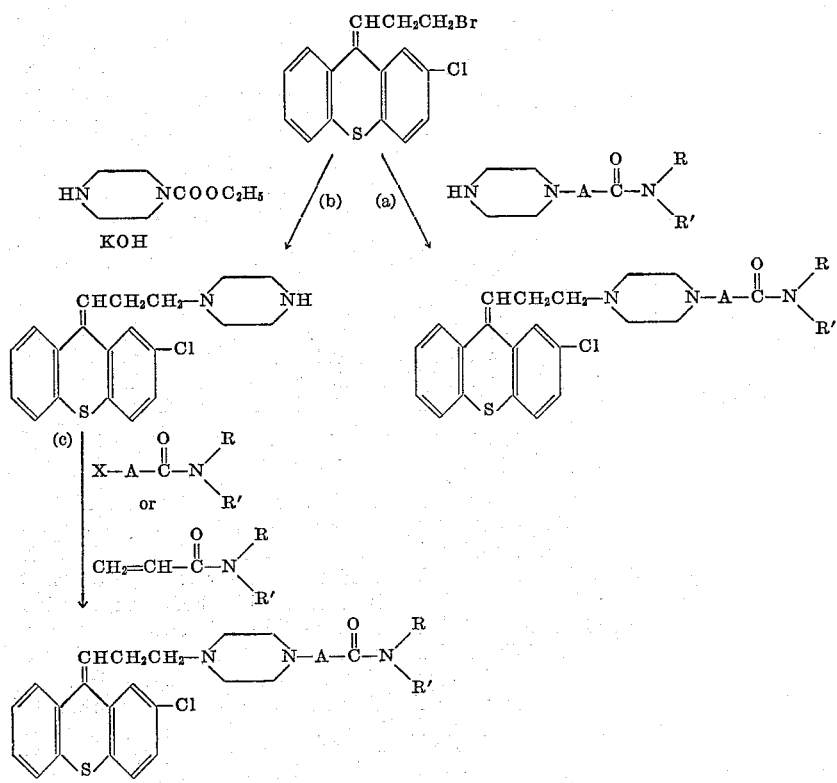

by side effects ascribable to the anions. However, when the products are the salts of toxic acids, they are readily converted to the free base by treatment with a strong base such as dilute sodium hydroxide.

The preferred new psychotherapeutic agents of the present invention possess high activity in the treatment of excited mental states. The dosage will be dependent upon various factors, such as the extent of mental excitement, whether mild or severe. However, tablets or capsules containing 2.5, 5, 10, 25 and 100 milligrams of instant therapeutic agents are convenient unit dosage forms.

The activity of the instant compounds was shown by symptomatology antagonism to amphetamine, potentiation of hexobarbital sleeping time and reduction in rectal temperatures in mice, by conditioned avoidance tests in rats, by symptomatology and inhibition of apomorphine-induced emesis in dogs and by symptomatology in monkeys.

The 2-chloro-9-[3-(4 - N - methylcarbamoylmethyl -1- piperazinyl)propylidene]thioxanthene dimaleate (mixture of the cis and trans isomers), for example, was found to be about three times as active as chloropromazine and chlorprothixene. One of the isomers, that which forms the dimaleate salt melting at 157°–159° C., was found to be six to ten times as active as the other isomer, and three to five times as active as the mixture of isomers.

A study of antiemesis in dogs wherein the compounds were administered intravenously showed the antiometic $ED_{50}$ of cis-2-chloro-9-[3-(4-N-methylcarbamoylmethyl-1-piperazinyl)propylidene]thioxanthene to be about three times that of a mixture of the cis- and trans- isomers. The antiemetic $ED_{50}$ of cis-2-chloro-9-{3-[4-(2-N-methylcarbamoylethyl - 1 - piperazinyl]propylidene}-thioxanthene, for example, was approximately five to eight times that of the cis- and trans- mixture.

The compounds of this invention may be administered alone but are generally administered as a composition with a pharmaceutical carrier selected on the basis of the chosen route of administration and standard pharmaceutical practice. For example, they may be administered orally in the form of tablets containing such excipients as starch, milk sugar, certain types of clay, etc. They may be administered in capsules either alone or in admixture with the same or equivalent excipients. They may also be administered orally in the form of elixirs or oral suspensions which may contain flavoring or coloring agents. They may be injected parenterally, that is, for example, intramuscularly or subcutaneously. For parenteral administration, they are best used in the form of a sterile aqueous solution which may contain other solutes, for example, enough saline or glucose to make the solution isotonic.

It is to be understood that the instant invention contemplates compounds of the type capable of existing as cis and trans isomers. While the isomeric mixtures exhibit therapeutic properties of the type possessed by these novel compounds, in all cases investigated the activity is greater in one pure isomer than in the other. In addition, the less active isomer is convertible to the more active one, such as by acid equilibration followed by fractional crystallization, and is thus useful as an intermediate.

It is to be further understood that the 2-chlorothioxanthenone of the reaction scheme illustrated hereinbefore can be made by known methods. One method, for example, involves condensing an alkali metal salt of a 2-halobenzoic acid with an alkali metal salt of a thiophenol in the presence of a copper catalyst of the type employed in the Ullmann reaction. The substituted 2-carboxyphenyl sulfide thus obtained is cyclized to the corresponding thioxanthenone with the aid of a dehydrating agent, such as concentrated sulfuric acid, phosphorus pentoxide, polyphosphoric acid, metaphosphoric acid and the like.

The following examples are given by way of illustration and are not to be construed as limitations of this invention, many variations of which are possible within the spirit and scope thereof.

*Example I.—2-chloro-9-[3-(4-carbamoylmethyl-1-piperazinyl)propylidene]thioxanthene dimaleate*

A mixture containing 0.4 mole of 3-t-amyloxypropyl magnesium bromide and 0.2 mole of 2-chlorothioxanthenone in 1200 ml. of anhydrous ethyl ether is refluxed for 24 hours. After refluxing, 2000 ml. of an ammonium chloride solution (20 g. ammonium chloride in 100 ml. water) is added to the reaction mixture. The ether phase is separated, washed with water and dried. Evaporation of the ether yields crude 2-chloro-9-hydroxy-9-(3-t-amyloxypropyl)-thioxanthene which is purified by recrystallization from isopropyl ether, M.P. 109–110° C. The product is refluxed with 1600 ml. of aqueous concentrated hydrobromic acid (48%) for 1 hour during which time gaseous hydrogen bromide is bubbled through the reaction mixture. Four liters of water are added to the mixture and the crude product extracted with ether. The ether extract is washed with water, sodium bicarbonate solution and dried. The ether is evaporated and the residual oil crystallized from an ether-petroleum ether mixture to yield 2-chloro - 9 - (3-bromopropylidene)thioxanthene, M.P. 64–65° C.

A solution of 3.52 g. (0.01 mole) of 2-chloro-9-(3-bromopropylidene)-thioxanthene and 4.3 g. (0.03 mole) of α-piperazinyl acetamide in 100 ml. of methylethyl ketone is refluxed for 12 hours. The solvent is removed by distillation in vacuo. The product is extracted with 25 ml. of ether and the ether extract washed twice with 50 ml. of water. The ether extract is treated with two 50-ml. portions of 1 N hydrochloric acid to extract the product. The separated organic layer is washed twice with 50 ml. of water. The aqueous washings are combined with the hydrochloric acid extracts and are washed with two 25-ml. portions of ether and the separated aqueous layer is made alkaline by the addition of 20% sodium hydroxide solution. The crude product is extracted with ether and the extract washed with water and dried over anhydrous magnesium sulfate. The solvent is removed by distillation. The product is obtained in 70% yield as the free base.

The free base is converted to the dimaleate salt by dissolving the base in 10 parts by weight of isopropanol, treating the solution with a solution of 2 molar equivalents of maleic acid in 10 parts by weight of isopropanol, removing by filtration the crystalline precipitate and recrystallizing the precipitate from an isopropanol-water mixture. The dimaleate salt melts at 160–162° C.

*Example II.—2-chloro-9-[3-(4-carbamoylethyl-1-piperazinyl)propylidene]thioxanthene dimaleate*

A solution of 0.01 mole of 2-chloro-9-(3-bromopropylidine)thioxanthene and 0.03 mole of carbethoxypiperazine in 100 ml. of methylethyl ketone is refluxed for about 12 hours. After refluxing is complete, the solvent is removed by distillation in vacuo. The product, 2-chloro-9-[3-(4-carbethoxy-1-piperazinyl)propylidene]thioxanthene, is dissolved in 125 ml. of ether and the ether extract is washed twice with 50 ml. of water. The ether extract is treated with two 50-ml. portions of 1 N hydrochloric acid to effect an acid extraction of the product. The separated organic layer is washed twice with 50 ml. of water. The aqueous washings are combined with the hydrochloric acid extracts and are washed with two 25-ml. portions of ether and the separated aqeous layer is made alkaline by the addition of 20% sodium hydroxide solution. The carbethoxy compound is extracted with ether and the extract washed with water. The solvent is removed by distillation. The carbethoxy compound is treated for about 12 hours with 4 N potassium hydroxide in refluxing 80% ethanol to yield 2-chloro-9-(3-piperazinylpropylidene)-thioxanthene.

A mixture of 2-chloro-9-(3-piperazinylpropylidene)thioxanthene (2.8 g.) and acrylamide (1.14 g.) in 30 ml. of dimethylformamide is stirred at 60° C. for 48 hours. The reaction mixture is poured into water and the product is extracted with ether. After washing with water, the ether layer is treated with two 50-ml. portions of 1 N hydrochloric acid to extract the basic product. The separated organic layer is washed twice with 50 ml. of water. The aqueous washings are combined with the hydrochloric acid extracts and are washed with two 25-ml. portions of ether and the separated aqueous layer is made alkaline by the addition of 10% sodium carbonate solution. The reaction product is extracted with ether and the extract washed with water and dried over sodium sulfate. The solvent is removed by distillation. The resulting oil is decolorized by treatment with charcoal in isopropanol.

The free base is converted to the dimaleate salt by dissolving the base in 10 parts by weight of isopropanol, treating the solution with a solution of 2 molar equivalents of maleic acid in 10 parts by weight of isopropanol, removing the crystalline precipitate by filtration and recrystallizing the precipitate from a water-methanol mixture. The dimaleate salt is obtained in 38% yield and melts at 175°–177° C. (d.).

*Example III*

The procedure of Example II is repeated substituting for acrylamide, stoichiometrically-equivalent amounts of other appropriate N-substituted acrylamides. There are obtained the following 2-chloro-9-[3-(4-N-substituted-carbamoylethyl-1-piperazinyl)propylidene]thioxanthenes:

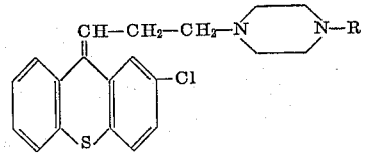

| R | M.P. of Dimaleate (° C.) |
|---|---|
| —CH₂—CH₂—C(O)—NHCH₃ | 174–177 |
| —CH₂—CH₂—C(O)—NH(CH₃)₂ | 177–179 |
| —CH₂—CH₂—C(O)—NHC₆H₅ | 174–176 |
| —CH₂—CH₂—C(O)—NHCH₂C₆H₅ | 163–165 |
| —CH₂—CH₂—C(O)—NHCH(CH₃)CH₂C₆H₅ | 175–177 |

*Example IV.—2-chloro-9-[3-(4-N-methylcarbamoylmethyl-1-piperazinyl)propylidene]thioxanthene dimaleate*

A mixture of 3.57 g. of 2-chloro-9-(3-piperazinylpropylidene)thioxanthene, 4.28 g. of α-chloro-N-methyl-acetamide and 2.76 g. of potassium carbonate in 30 ml. of dimethylformamide is stirred at room temperature for 25 hours. The reaction mixture is poured into water and the product is extracted with ether. After washing with water, the ether layer is treated with two 50-ml. portions of 1 N hydrochloric acid to extract the basic product. The separated organic layer is washed twice with 50 ml. of water. The aqueous washings are combined with the hydrochloric acid extracts and are washed with two 25-ml. portions of ether and made alkaline with 10% sodium carbonate solution. The reaction product is extracted with ether and the extract washed with water and dried over sodium sulfate. The solvent is removed by distillation. The resulting oil is decolorized by treatment with charcoal in isopropanol containing a trace of carbon disulfide. The free base is converted to the dimaleate salt by dissolving the base in 10 parts by weight of isopropanol, treating the solution with a solution of 2 molar equivalents of maleic acid in 10 parts by weight of isopropanol, removing the crystalline precipitate by filtration and recrystallizing the precipitate from a water-acetonitrile mixture. The dimaleate salt is obtained in 67% yield and melts at 141–143° C. (d.).

The free base in chloroform exhibits, among the peaks in the infrared spectrum, a characteristic peak at 1680 cm.⁻¹; this is indicative of the presence of the amide carbonyl group. The ultraviolet spectrum of the free base shows λmax 325 mμ and λmax 270 mμ; this is indicative of the presence of the Δ⁹- double bond.

*Example V*

The procedure of Example IV is repeated substituting for α - chloro - N - methylacetamide, stoichiometrically-equivalent amounts of other appropriate N-substituted α-chloro- or bromo- acetamides. There are obtained the following 2-chloro-9-[3-(4-N-substituted carbamoylmethyl-1-piperazinyl)propylidene]-thioxanthenes:

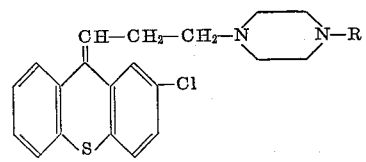

| R | M.P. of Dimaleate (° C.) |
|---|---|
| —CH₂—C(O)—NHCH₂CH₃ | 148–150 |
| —CH₂—C(O)—NHCH(CH₃)₂ | 165–167 |
| —CH₂—C(O)—NHC(CH₃)₃ | 175–177 |
| —CH₂—C(O)—NHCH₂CH=CH₂ | 149–151 |
| —CH₂—C(O)—NHCH₂C(CH₃)=CH₂ | 175–177 |
| —CH₂—C(O)—NHCH₂CH₂C₆H₅ | 156–158 |
| —CH₂—C(O)—NHCH₂CH₂OH | 145–147 |
| —CH₂—C(O)—N(CH₃)₂ | 191–193 |
| —CH₂—C(O)—N(piperidinyl) | 180–182 |
| —CH₂—C(O)—N(4-phenylpiperazinyl) | 180–183 |

*Example VI.—2-chloro-9-{3-[4-(1-N-methylcarbamoylethyl) - 1-piperazinyl]propylidene} - thioxanthene dimaleate*

This compound is made by the procedure set forth in Example IV except that 2-chloro-9-(3-piperazinylpropylidene)thioxanthene is reacted with α-chloro-N-methyl-propionamide. The dimaleate has a melting point of 176–177° C.

*Example VII.—2 - chloro - 9 - [3-(4-N-methylcarbamoyl-methyl-1-piperazinyl)propylidene]thioxanthene hydrochloride*

The hydrochloric acid addition salt of 2-chloro-9-[3-(4-N-methylcarbamoylmethyl - 1-piperazinyl)propylidene] thioxanthene is prepared by mixing an acetone solution of the free base with an aqueous solution containing a stoichiometrically equivalent of hydrochloric acid and evaporating the resulting solution. The hydrochloride is obtained as a crystalline solid.

*Example VIII.—Cis-2-chloro-9-[3-(4-N-methylcarbamoyl-methyl - 1 - piperazinyl)propylidene]-thioxanthene dihydrobromide*

To a solution of 4.19 g. of the free base of Example IV is 100 ml. of 95% aqueous isopropanol are added 2 ml. of concentrated hydrobromic acid. As the solution is slowly cooled, 1 g. of crystalline material, M.P. 231°–232° C. (d.), separates out. This material is filtered and recrystallized from 95% aqueous isopropanol and melts at 236°–238° C. (d.). An assay by thin layer chromatography shows the product to contain less than 5% of the trans- isomer.

*Example IX.—Trans-2-chloro-9-[3-(4-N-methylcarbamoyl-methyl - 1-piperazinyl)propylidene]-thioxanthene dipicrate*

To the mother liquor, obtained after filtering the dihydrobromide of Example VIII, containing 0.04 mole of a mixture of approximately 70% trans- and 30% cis-isomer, is added one half equivalent (0.04 mole) of picric acid. The precipitate which forms is filtered and recrystallized twice from 8% aqueous dimethylformamide. The dipicrate obtained melts at 220°–221° C. (d.) and is the trans-isomer, containing less than 5% of the cis-isomer. The analysis for $C_{23}H_{26}ClN_3OS \cdot 2C_6H_3N_3O_7$ is—Calculated: N=14.2. Found: N=14.1.

*Example X.—Cis-2-chloro-9 - [3-(4-N-methylcarbamoyl-methyl - 1 - piperazinyl)propylidene] - thioxanthene dipicrate*

This isomer is obtained by adding two molar equivalents of picric acid to a solution of the free base (1:1 isomer composition) in 70% aqueous dimethylformamide. The compound exhibits a melting point of 223°–224° C. (d.). The analysis for $C_{23}H_{28}ClN_3OS \cdot 2C_6H_3N_3O_7$ is—Calculated: N=14.2. Found: N=14.1.

*Example XI.—Trans-2-chloro-9-[3-(4-N-methylcarbamoyl-methyl - 1 - piperazinyl)propylidene] - thioxanthene dimaleate*

The trans-dipicrate of Example IX is converted to the free base by passing a 60% aqueous methanolic solution of the trans-dipicrate through Amberlite No. IR-45 (Rohm & Haas: a polystyrene base polyamine type weakly basic anion exchange resin). The trans-free base is dissolved in 10 parts by weight of isopropanol. To the solution is added a solution of 2 molar equivalents of maleic acid in 10 parts by weight of isopropanol. The precipitate which forms is filtered and recrystallized from a water-acetonitrile mixture to yield the trans-dimaleate salt melting at 157°–159° (d.). The analysis for $C_{23}H_{26}ClN_3OS \cdot 2C_4H_4O_4$ is—Calculated: C, 56.4; H, 5.2; N, 6.4. Found: C, 56.2; H, 5.5; N, 6.1.

*Example XII.—Cis- and trans-2-chloro-9-(3-bromopropylidene)thioxanthene*

The cis- isomer is obtained by adding 16.2 g. of a mixture of isomers (1:1) to 100 ml. of isopropyl ether and cooling to 0° C. The cis- isomer is filtered and is recrystallized from isopropyl ether. It melts at 82°–86° C. The analysis for $C_{16}H_{12}BrClS$ is.—Calculated: C, 54.6; H, 3.4. Found: C, 54.8; H, 3.5.

The addition of n-hexane to the mother liquor remaining after the cis- isomer has been removed results in the precipitation of the trans- isomer, melting at 85°–87° C.

*Example XIII.—Trans-2-chloro-9 - {3-[4-(2-N-methylcarbamoylethyl)-1-piperazinyl]propylidene}thioxanthene*

A solution of 3.31 g. of trans-2-chloro-9-(3-bromopropylidene)thioxanthene and 3.25 g. of 1-(N-methylcarbamoylethyl)piperazine in 75 ml. of acetone is refluxed for 16 hours. At the end of this time, the solvent is evaporated and 100 ml. of water are added. The mixture is made alkaline with sodium bicarbonate. The product is extracted with three 40-ml. portions of methylene chloride and the extract is washed with 75 ml. of water. The methylene chloride extract is treated with two 50-ml. portions of 1 N hydrochloric acid and made alkaline with a 10% solution of sodium carbonate. The product is extracted with three 100-ml. portions of methylene chloride and the extract dried over sodium sulfate. The solvent is evaporated leaving 2.5 g. (60% yield) of a product melting at 159°–161° C. The product is recrystallized from a 3:1 mixture of isopropyl ether-methylene chloride and melts at 166–167° C. Thin layer chromatography shows the product to contain less than 10% of the cis-isomer.

*Example XIV.—Cis-2-chloro-9-{3-[4-(2-N-methylcarbamoylethyl)-1-piperazinyl]propylidene}thioxanthene*

The procedure of Example XIII is followed using cis-2-chloro-9-(3-bromopropylidene)thioxanthene. The crystaline product obtained has a melting point of 145–147° C.

What is claimed is:

1. A compound selected from the group consisting of the formula:

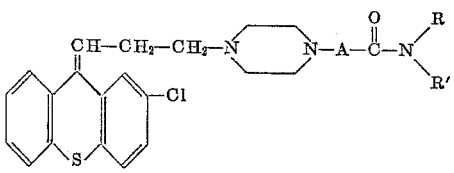

and the acid addition salts thereof; wherein R is a member selected from the group consisting of hydrogen, lower alkyl, phenyl, tolyl, phenylene, phenylalkyl, the alkyl radical containing from about one to about five carbon atoms, lower alkenyl and lower hydroxyalkyl; R' is a member selected from the group consisting of hydrogen and lower alkyl and R and R' when taken together with the nitrogen atom to which they are attached form a cyclic member selected from the group consisting of pyrrolidino, piperidino, piperazino and morpholino; and wherein A is a lower alkylene having from about one to about three carbon atoms.

2. A compound of claim 1 wherein R and R' are each hydrogen.

3. A compound of claim 1 wherein R is hydrogen and R' is a lower alkyl radical.

4. A compound of claim 1 wherein R and R' are each a lower alkyl radical.

5. A compound of claim 1 wherein R and R' when taken together with the nitrogen atom to which they are attached from a cyclic member selected from the group consisting of pyrrolidino, piperidino, piperazino and morpholino.

6. 2-chloro-9-[3-(4-carbamoylmethyl - 1 - piperazinyl)-propylidene]thioxanthene.

7. 2-chloro-9-[3 - (4 - N - methylcarbamoylmethyl - 1-piperazinyl)propylidene]thioxanthene.

8. 2-chloro-9-[3-(4-N-ethylcarbamoylmethyl-1 - piperazinyl)propylidene]thioxanthene.

9. 2-chloro-9-{3-[4-(1-N - methylcarbamoylethyl) - 1-piperazinyl]propylidene}thioxanthene.

10. 2-chloro-9-{3-[4-(2-N - methylcarbamoylethyl) - 1-piperazinyl]propylene}thioxanthene.

11. Trans-2-chloro-9-[3-(4-N-methylcarbamoylmethyl-1-piperazinyl)propylidene]thioxanthene.

12. Cis-2-chloro-9-[3-(4-N-methylcarbamoylmethyl - 1-piperazinyl)-propylidene]thioxanthene.

13. Trans-2-chloro-9-{3-[4-(2-N - methylcarbamoylethyl)-1-piperazinyl]propylidene}thioxanthene.

14. Cis-2-chloro-9-{3-[4-(2 - N - methylcarbamoylethyl)-1-piperazinyl]propylidene}thioxanthene.

References Cited by the Examiner

UNITED STATES PATENTS

| | | | |
|---|---|---|---|
| 2,940,969 | 6/60 | Bonvicino et al. | 260—268 X |
| 2,979,502 | 4/61 | Gailliot et al. | 260—268 X |

FOREIGN PATENTS

| | | |
|---|---|---|
| 215,424 | 6/61 | Australia. |

NICHOLAS S. RIZZO, *Primary Examiner.*